March 17, 1931.　　　E. A. SEWARD　　　1,796,628
SPARE TIRE ATTACHMENT
Filed May 9, 1929　　　2 Sheets-Sheet 1
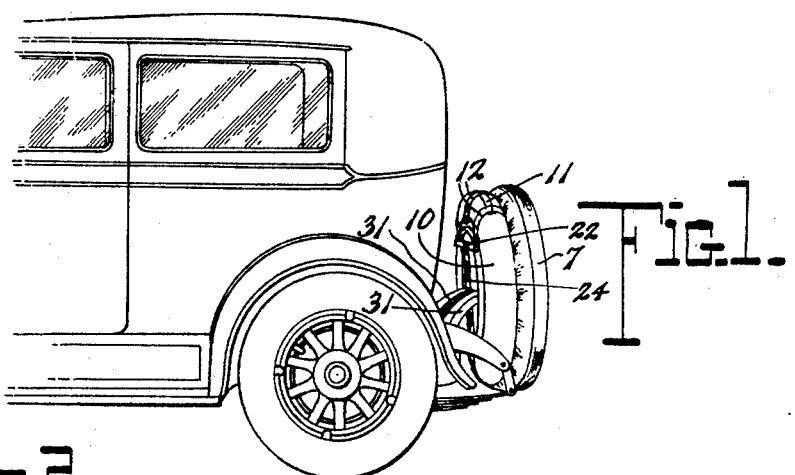
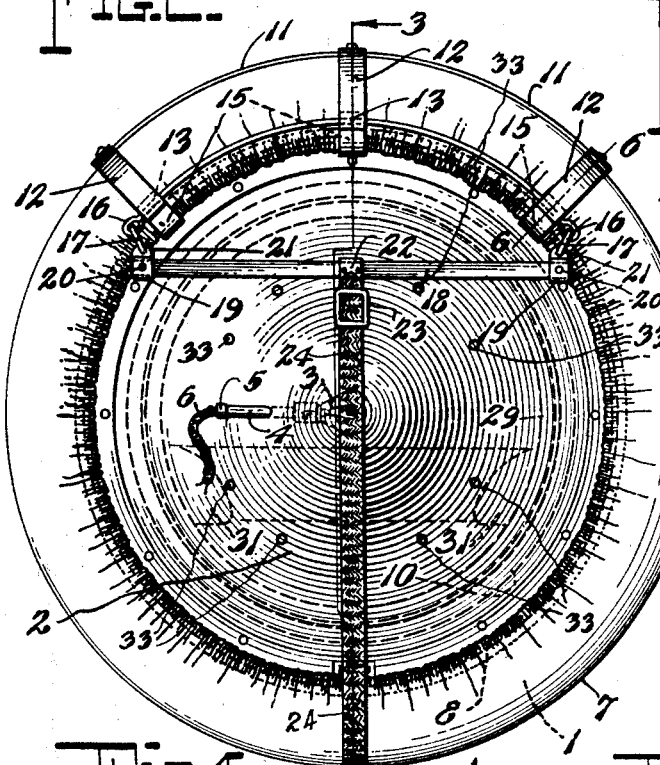
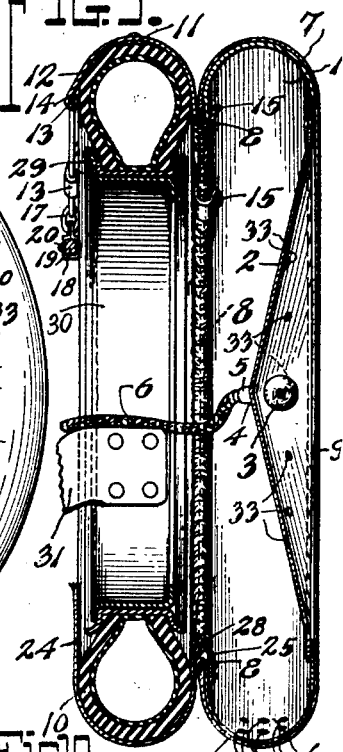
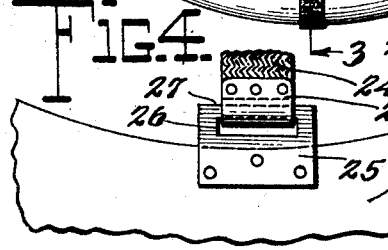
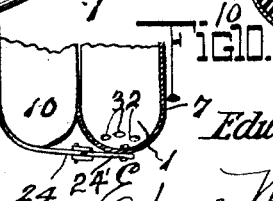
Inventor:
Edward A. Seward,
By Edgar M. Kitchin
his Attorney March 17, 1931.  E. A. SEWARD  1,796,628
SPARE TIRE ATTACHMENT
Filed May 9, 1929  2 Sheets-Sheet 2
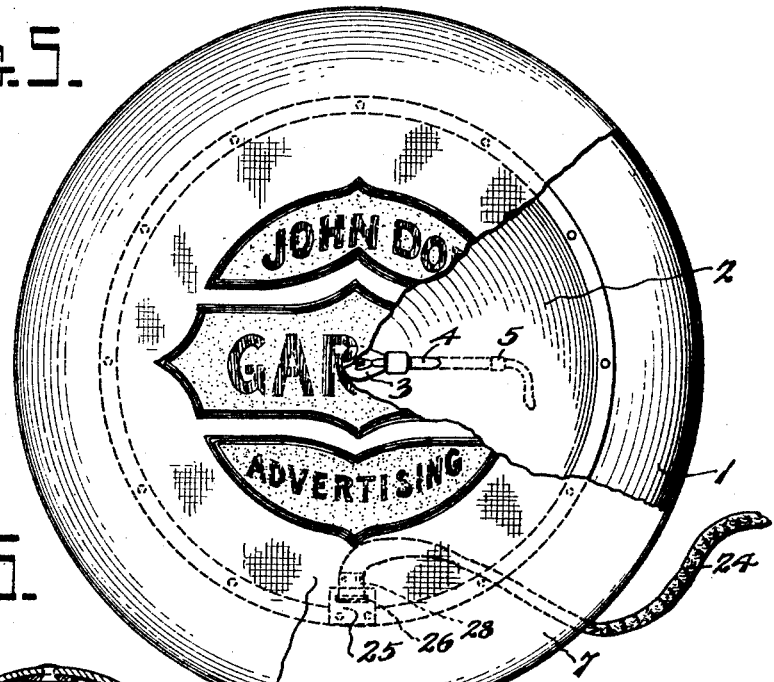
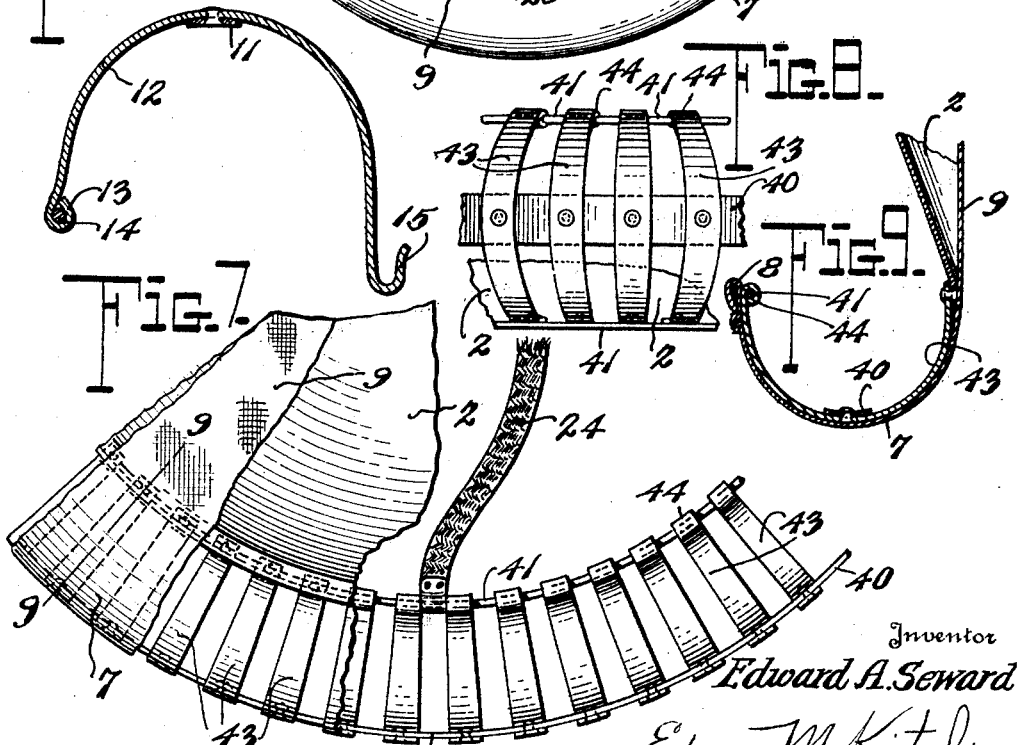
Inventor
Edward A. Seward
By Edgar M Kitchin
his Attorney.

Patented Mar. 17, 1931

1,796,628

UNITED STATES PATENT OFFICE

EDWARD A. SEWARD, OF COLUMBUS, GEORGIA

SPARE-TIRE ATTACHMENT

Application filed May 9, 1929. Serial No. 361,623.

This invention relates to improvements in appliances adapted for use in conjunction with an automobile or like vehicle, and is characterized by its capacity to improve the appearance of such vehicle and also serve as a signalling device.

Among the objects in view is the provision of means for easily and quickly attaching and readily detaching a structure possessing the semblance of an extra spare tire, and the physical capacity for signalling, as by the illumination of an appropriate sign.

A more detailed object is the provision of a structure closely resembling the external appearance of an automobile tire, the provision of lighting means for an interior portion thereof, and the provision of means for mounting the structure to present the appearance of a spare tire on a vehicle.

A still further object is the provision of means readily applicable to and quickly detachable from a spare tire for sustaining a signalling apparatus in operative relation to the spare tire and retaining the same against relative movement with respect to the spare tire.

With these and further objects in view as will in part hereinafter become apparent and in part be stated, the invention comprises a signalling apparatus simulating a spare tire; and also comprises such an apparatus including an internally located light and a reflector extending across substantially the entire space enclosed by such simulation of a spare tire.

The invention also includes a cover for such simulated spare tire comprising peripheral portions and a portion lying across the light and reflector and formed of sufficiently translucent material to be illumined by the light for signalling or display purposes.

The invention also comprises, in combination with such a simulated spare tire, means for easily, quickly, and effectively anchoring the same to a true spare tire adapted for ready detachment therefrom.

The invention also comprises certain other novel constructions, combinations, and arrangements of parts as subsequently specified and claimed.

In the accompanying drawings,—

Figure 1 is a perspective view of an embodiment of the present invention illustrated in use.

Figure 2 is a front view thereof on a greatly enlarged scale over the showing in Figure 1, the view being taken as from a plane of observation in the rear of the automobile or other vehicle and in front of the true spare tire with the true spare tire and its carrier illustrated in dot and dash lines to enable showing of the embodiment of the present invention in full lines.

Figure 3 is a vertical section taken on the plane indicated by line 3—3 of Figure 2, parts being seen in elevation, and the true spare tire and its carrier being shown in full lines.

Figure 4 is an enlarged, detailed, fragmentary elevation illustrating the anchorage of the retaining strap.

Figure 5 is a rear elevation of the simulated spare tire detached, parts being broken away for disclosing otherwise concealed parts.

Figure 6 is an enlarged, detailed, transverse section through one of the hanger parts.

Figure 7 is a fragmentary, sectional elevation of a slightly modified embodiment of the structure seen in Figure 5.

Figure 8 is an inverted plan of the skeletonized portion of the parts seen in Figure 7.

Figure 9 is a fragmentary, transverse section taken on the plane indicated by line 9—9 of Figure 7.

Figure 10 is a fragmentary section similar to Figure 3 on a reduced scale illustrating a modified attachment of the retaining strap, the true tire being seen in elevation and the cover omitted.

The idea of applying some form of illuminated display or signalling apparatus within a spare tire and in some manner anchored thereto has been popularly accepted, and some progress has been made to the end of providing easy means of application and removal of the parts to and from the spare tire. But, at best, such apparatus has added to the labors of the operator who has occasion to remove and replace the spare tire. It is an object of the present invention to largely reduce such labors by providing a complete unit separate from the spare tire and made to be easily and quickly attached to and detached from such spare tire, and while in use to give the appearance of an extra spare tire, whereby the vehicle presents to the observer the appeal of that touch of luxury inherent in the presence of the abundance of precaution suggested by two spare tires.

To accomplish this and other results, as will become obvious, an annular, hollow body 1 is provided of the size and possessing approximately the external contour of a spare tire. The body 1 may be of thin sheet iron or may be a mere framework or skeleton, as hereinafter pointed out in detail. Arranged within and extending across the space surrounded by the body 1 is preferably located a reflector bell 2 provided centrally with a light 3, such as an electric bulb, having its open socket extending through the reflector at 4 to receive the terminal 5 of an armored cable 6 supplying current to light 3. The terminal 5 is preferably of the usual, detachable form, so that cable 6 may be readily applied and removed as desired. Cable 6 is connected in any appropriate manner (not illustrated) to the battery or other current source on the automobile. It will be noted that the rear portion of the shell or body 1 extends inward or toward the center a greater distance than the forward marginal portion of the said body, said forward marginal portion extending inward only sufficiently to give the requisite physical appearance of a second spare tire when sustained in juxtaposition to the true spare tire. Of course, such forward margin may be extended inward to any extent desired to facilitate application to appropriate sustaining apparatus, but the relative location, as seen in Figure 3, is preferred as ample for all practical purposes and for affording the visual results desired. The space surrounded by the forward margin of the shell or body 1 is left open while the corresponding space of the rear margin is closed by the reflector 2, which reflector may be fixed detachably or otherwise at spaced intervals about its margin to the adjacent marginal portion of the body 1. Such attachment is sufficient to prevent any relative movement between the parts, so that in use the reflector 2 possesses the capacity of completing the disc-like appearance of the body 1, when the reflector is exposed. The reflector is bell or funnel shaped, and, therefore, cones inward from its contact with the rear portion of the body 1 sufficiently to accommodate the light 3 without having the light extend across the plane of the rear face of the body 1.

Body 1 is preferably covered during use both to increase the simulation to a spare tire and to provide a support for a display or signalling screen. The cover for body 1 may consist of the usual fabric 7 having an elastic, free, forward margin 8. The elastic margin 8 is produced preferably by the use of a helical spring enclosed in a circumferential, marginal pocket formed of the material of the cover or fabric 7. The margin 8 preferably does not extend inward as far as the extremity of the forward margin of body 1, so that said marginal extremity of body 1 is exposed sufficiently to directly engage the supporting means hereinafter specified. At its rear portion, the cover 7 is engaged by and carries a screen 9, which may be of any appropriate translucent material such as the commercial glass fabric, which is a woven wire interfilled with a translucent substance of the cellulose base, and which provides an appropriate fabric support for a display sign which may be painted or otherwise applied to the rear face of the screen 9. The screen 9 may be permanently fixed to the fabric 7 or detachably connected thereto, as by the employment of snap fasteners of the glove button type.

An appropriate frame is employed and applied to the spare tire 10, the frame consisting essentially of a strap 11 located to extend circumferentially about a portion of the spare tire 10 along the median line thereof and carrying transversely arranged yoke or collar-shaped straps 12, 12. Each strap 12 at its forward end is looped at 13 and a rod 14 is extended through and fixed to each of the several loops 13. Any appropriate number of the yokes 12 may be employed, but I find that three provide amply for the purpose intended. The outer terminal portions of the several yokes 12, as best seen in Figure 6, are bent to provide supporting hooks 15 into which is set the free forward marginal portion of the shell or body 1 during use. The rod 14 extends beyond the loops 13 of the terminal yokes 12 at each end and is formed into an eye 16, each engaged by a pendent link 17. A cross bar 18 is provided at its terminals with sleeves or ferrules 19, one at each end, and each preferably riveted at 20 to the bar 18 to insure against relative movement of the respective sleeve 19. Upstanding from each sleeve 19 is an ear 21 through which the respective link 17 extends, so that the bar 18 loosely depends from the loops 16. The bar 18 is preferably somewhat flexible to facilitate tensioning of the parts and maintaining the same under tension as hereinafter indicated. A strap 22 is fixed to the bar 18 preferably midway thereof, as by being riveted or otherwise appropriately connected to the bar. The strap 22 is also preferably looped over the bar to increase the effectiveness of the anchorage. Appropriately connected to the strap 22 and pendent therefrom is a suitable buckle 23 designed in operation to be engaged by a strap 24 which pivotally engages the forward marginal portion of body 1 at a point diametrically opposite that point of body 1 which engages the middle hook 15. The connection of the strap 24 to body 1 is capable, of course, of a substantial range of variation, one acceptable form of connection consisting of a plate 25 riveted to the body 1 slotted at 26 to provide a pivot bar 27 about which is looped the metal terminal 28 of strap 24. The plate 25 upstands from the body 1 sufficiently to allow free play of the part 28 without interference with the marginal portion 8 of cover 7.

It should be understood that the true spare tire 10 is mounted on the usual demountable rim 29, or otherwise appropriately sustained, and in turn detachably secured on the tire carrier 30 having the customary brackets 31 fixed to the chassis of the automobile. The mode of mounting and support of the true tire 10 is no part of the present invention and may be of any conventional form.

In the practicing of the present invention, the automobile being supplied with a true spare tire 10, which may be provided with the usual spare tire cover, or may be left uncovered at the wish or caprice of the user, when the present improved display apparatus is first mounted on the true spare 10, by arranging the medial yoke 12 at the top of the spare 10, preferably approximately in the vertical plane of the axis of said spare, and with the bar 18 located approximately as illustrated in Figures 2 and 3 pendent from the supporting frame made up of the yokes 12 and their connected parts. The work of applying this support is momentary and amounts almost to nothing, consisting merely in manually applying the support. When this is done, the imitation spare or body 1 is lifted slightly above and lowered to cause its forward margin to enter and rest in the supporting hooks 15. The operator then passes the strap 24 which has been depending from the bracket 25 about the true spare 10, after the manner indicated in Figures 2 and 3, and passes the free end of said strap 24 through the buckle 23 and draws down on the bar 18 sufficiently to clamp the supporting frame firmly in its engagement with the true spare 10. The bar 18 is sufficiently resilient to enable the strap to slightly bow the same and thus leave the parts in a condition of constant tension which insures a firm gripping by the yokes 12 and strap 24 of the true spare 10 and sufficient frictional resistance to prevent circumferential creeping of the clamped parts. Also, the resilience of the bar 18 and the resulting firm clamping of the parts against the true spare 10 insures against any possible rattling of the parts, and particularly insures such a downward stress on the imitation spare or body 1 at the place of the bracket 25 as to cause the engagement with the hooks 15 to remain firm and constant and to insure against rattling or squeaking at these points. The application of the display apparatus is thus very quickly, simply, and easily applied and effectively maintained. It is desirable, of course, when and if the light 3 is to be used, to hook up the supply cable 6 with the socket of the light, and this may be done either just before the margin of the body 1 is dropped into the hooks 15, or after the parts have been firmly clamped in their seated position. Appropriate precaution will, of course, be taken to see that the cable 6 is anchored in a sufficiently taut condition to avoid rattling or other noise making.

The display apparatus is constructed or arranged to be complete in and of itself, so that, when it is mounted, the screen 9 will be in place and what ever signal display or sign is carried will have already been appropriately located for the purposes intended. In other words, if lettering or other like indicia be employed, the screen 9 will be so located that the diametrically opposite part of the body 1 from the bracket 25 being considered uppermost, the lettering will be in an upright position. Also, it will be understood that while the screen 9 has been referred to as consisting specifically of a definite form of material, any other appropriate sheeting or fabric of translucent, parti-translucent or transparent material may be utilized.

In Figures 7, 8, and 9 is illustrated a display device incorporating a slightly modified embodiment of the present invention in which all the parts are identically the same as above described, and the same reference numerals have, therefore, been used and the same description is applicable, except that the imitation spare is skeletonized instead of being formed of a continuous sheet or stamping, and, to this end, comprises a medial ring 40 and two marginal rings 41, 41, the latter being of less diameter and spaced laterally of the ring 40, and the three rings being connected by approximately semi-circular cross strips 43, each appropriately fixed to each one of the rings 40 and 41. The medial ring 40 is preferably a strap to which the cross straps 43 are riveted, while the inner or forward ring 41 may be a rod about which the respective terminals of the several cross straps 43 are looped at 44. The outer or rear ring 41 is the bordering or terminal flange of the cone or reflector 2, and is appropriately riveted to the several cross straps 43, as seen in Figures 8 and 9. The strap 24 in this construction is preferably directly pivotally connected to the forward ring 41 between two of the straps 43. The structure is applied and otherwise utilized exactly as set forth with respect to the showing in Figures 1 to 6 inclusive. It should be observed that the imitation spare or body may be otherwise constructed or skeletonized so long as sufficient stability is provided to support a spare tire cover and afford the appearance of an extra spare tire while providing an appropriate sustaining frame for the display screen and for the lighting apparatus therefor.

To avoid collection of moisture in the imitation spare or hollow body 1, perforations 32 are provided in the lowermost part of the body and are extended through the cover 7. Also, it should be noted that while the strap 24 is shown connected to the forward margin of body 1, it may be attached elsewhere, and, in fact, may be applied to the lowermost peripheral portion of the body 1, as at 24' in Figure 10, with efficient results. This latter arrangement will, of course, cause the strap 24 to extend directly across the open space between the body 1 and the true tire 10, and has been found to cause the body 1 to lie at its lower portion a little more snugly in contact with the true tire 10.

Also, the reflector 2 is provided with ventilating openings 33 to afford circulation in the space between screen 9 and the reflector and thereby protect the screen against excessive heat.

What is claimed is:

1. An imitation spare tire comprising a substantially rigid, shell-like, annular body, and a light reflector arranged within and connected to the rear margin of said body, the forward margin of said body being left free for detachable anchorage to a support.

2. In display apparatus, the combination of an imitation spare tire having an annular, shell-like body providing a free, forward margin, and means adapted to engage said free margin for detachably sustaining said body.

3. In display apparatus, the combination of an imitation spare tire having an annular, shell-like body providing a free, forward margin, and a hook adapted to be carried by a true spare tire in position for detachably engaging the free, forward margin of the annular, shell-like body for sustaining the same.

4. In display apparatus, the combination of an imitation spare tire having an annular, shell-like body providing a free, forward margin, a hook adapted to be carried by a true spare tire in position for detachably engaging the free, forward margin of the annular, shell-like body for sustaining the same, and means for clamping said margin firmly in said hook.

5. In display apparatus, the combination of an imitation spare tire having an annular, shell-like body providing a free, forward margin, a hook adapted to be carried by a true spare tire in position for detachably engaging the free, forward margin of the annular, shell-like body for sustaining the same, and means for clamping said margin firmly in said hook, the last-named means including means for also clamping the hook in engagement with the true spare tire.

6. In display apparatus, the combination of a support adapted to engage a true spare tire, an imitation spare tire adapted to be detachably sustained by said support, and means for clamping the support to a true spare tire and at the same time clamping the imitation spare tire in its engagement with the support.

7. In display apparatus, the combination of an imitation spare tire, a hook adapted to engage and sustain the same, means carrying said hook adapted to enclose the peripheral portion of a true spare tire, and means engaging a portion of the imitation spare tire at a point remote from the hook and adapted to be extended about the true spare tire into retaining engagement with the hook carrying means.

8. In display apparatus, the combination of an imitation spare tire, a hook adapted to engage and sustain the same, means carrying said hook adapted to enclose the peripheral portion of a true spare tire, and means engaging a portion of the imitation spare tire at a diametrically opposite point from the hook and adapted to be extended about the true spare tire into retaining engagement with the hook carrying means.

9. In display apparatus, the combination of a hook, an imitation spare tire adapted to be sustained thereby, carrying means for the hook adapted to overhang the peripheral portion of the uppermost part of a true spare tire, and means engaging the lowermost portion of the imitation spare tire and adapted to be extended about the lowermost portion of the true spare tire to engagement with the hook carrying means.

10. In display apparatus, the combination, with display means adapted to be sustained by a spare tire for an automobile of sustaining means for the display means adapted to surround a peripheral portion of the spare tire, and means connecting the said sustaining means to a spaced portion of the display means, said connecting means including means for tensioning the sustaining means in its engagement with the spare tire.

11. In display apparatus, the combination, with display means adapted to be sustained by a spare tire for an automobile, of sustaining means for the display means adapted to surround a peripheral portion of the spare tire, and means connecting the said sustaining means to a spaced portion of the display means, said connecting means including means for tensioning the sustaining means in its engagement with the spare tire and also in its engagement with the display means.

12. In display apparatus, the combination, with display means adapted to be sustained by a spare tire for an automobile, of sustaining means for the display means adapted to engage and enclose a peripheral portion of the spare tire at spaced points thereon, a resilient bar connecting the spaced part of the sustaining means, and means of anchorage of the display means to said bar adapted to maintain the bar under tension.

13. In attachments for vehicles, the combination of a simulation of a spare tire formed of a hollow frame having an open side presenting an exposed edge, and means engaging the exposed edge for anchoring the frame to a vehicle.

14. In attachments for vehicles, the combination of a simulation of a spare tire formed of a hollow frame having an open side presenting an exposed circumferential edge adapted to detachably receive anchorage means, and means detachably engaging a portion of said edge for connecting the frame to a vehicle.

In testimony whereof I affix my signature.

EDWARD A. SEWARD.